United States Patent
Liu et al.

[11] 3,880,498
[45] Apr. 29, 1975

[54] ZOOM LENS ASSEMBLY

[75] Inventors: Wai-Min Liu, Arleta; Roscoe J. Donnel, Glendale, both of Calif.

[73] Assignee: Xerox Corporation, Stamford, Conn.

[22] Filed: Oct. 15, 1973

[21] Appl. No.: 406,734

[52] U.S. Cl. ............................... 350/184; 350/214
[51] Int. Cl. ............................................. G02b 15/16
[58] Field of Search ............................ 350/184, 186

[56] References Cited
UNITED STATES PATENTS
3,630,599  12/1971  Donnel ............................... 350/184

Primary Examiner—John K. Corbin
Assistant Examiner—Conrad Clark

[57] ABSTRACT

A zoom lens assembly particularly adapted to be utilized in a copier apparatus and which comprises two moving groups, each having four optical elements that move in a manner to form a high-quality optical image over the magnification range of approximately −1.008 to −0.65. The lens assembly is achromatic over the spectrum from 4050A to 5900A. The object image distance is fixed and remains constant. The front movable group comprises a negative meniscus member convex to the front, a second negative meniscus member spaced from said first meniscus member, a third negative meniscus member convex to the front spaced from said second negative meniscus member, and a positive meniscus member convex to the front spaced from said third negative meniscus member. The second movable group comprises a durable convex member, a double concave member spaced from said double convex member and a doublet comprising a double concave member having a double convex lens cemented thereto.

2 Claims, 1 Drawing Figure

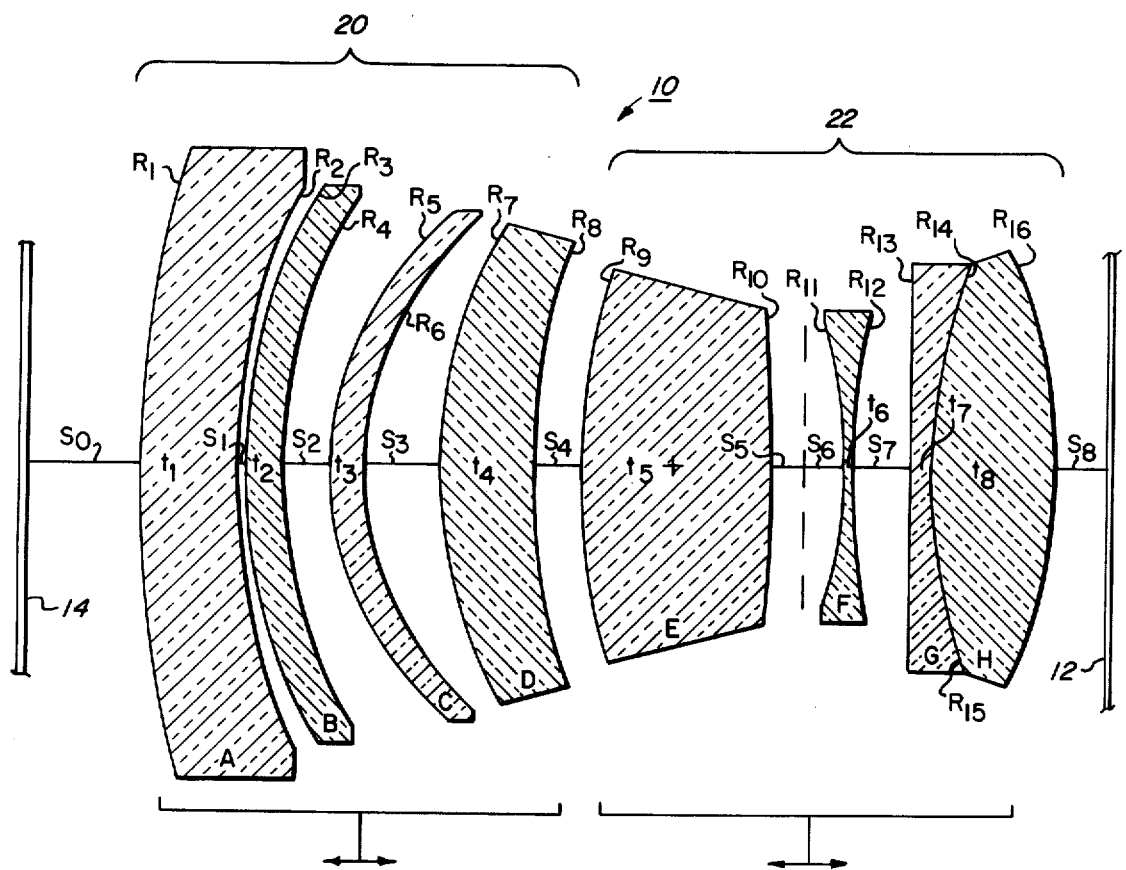

ZOOM LENS ASSEMBLY

BACKGROUND OF THE INVENTION

In the prior art copying systems, such as those utilizing the xerographic process, copying of material has customarily been accomplished by the use of fixed focal length lenses. To change the magnification, it was necessary to change the track length (the overall optical distance from the object to image) and then refocus the lens system. Alternatively, the prior art provided "add" lenses which were added to the original lens system to extend the useful range of magnification. Magnification would result in the former by moving the film gate or the image receptor, i.e., xerographic plate or drum, with the associated mechanisms, or in the latter situation inserting add lenses and then refocusing the system. The complexities and the inaccuracies with these techniques are quite obvious.

The convenience of a mechanically compensated zoom lens system to compensate for this problem had been recognized in the past. For example, U.S. Pat. Nos. 3,360,325 and 3,640,605 describe prior art systems for solving this problem. Although adequate for the purposes envisioned in the aforementioned patents, the system does not meet the necessary resolution and distortion requirements in the required spectral band and magnification ranges which are required in copier systems. The zoom lens assembly should provide an image which remains in focus throughout the zoom range and wherein the $f$/number similarly remains constant throughout this range.

SUMMARY OF THE PRESENT INVENTION

The present invention provides a zoom lens assembly particularly adapted for projecting images from the object plane to the image plane at magnifications in the range from approximately $-1.008$ to $-0.65$, and operating in a wavelength range from about 4050 angstroms to 5900 angstroms with a constant $f$/number of 12.46 and a field view of approximately 44° (wide angle). The lens assembly is achromatic over the aforementioned wavelength range.

The zoom lens assembly is particularly adaptable for use in a copying apparatus whereby the image projected from the object being copied remains in focus throughout the zoom range and wherein the $f$/number also remains constant throughout the zoom range.

It is an object of the present invention to provide an improved zoom lens assembly.

It is a further object of the present invention to provide an improved zoom lens assembly having a magnification range from $-1.008$ to $-0.65$, which minimizes distortion and which provides high resolution within the spectral ranges set forth hereinafter.

In particular, the above and other objects of this invention are achieved by providing a zoom lens assembly wherein the assembly is made up of two movable groups, the movable groups each comprising four optical elements.

DESCRIPTION OF THE DRAWINGS

For a better understanding of the invention as well as other objects and further features thereof, reference is made to the following description which is to be read in conjunction with the following drawing wherein:

The sole FIGURE is an optical diagram of an embodiment of the invention.

BRIEF DESCRIPTION OF THE PREFERRED EMBODIMENT

The sole FIGURE is an optical diagram of an embodiment of the present invention.

Referring now to the drawing, the lens assembly as a whole is designated by the reference number 10, the object plane of the lens assembly is designated by the reference numeral 12 and the image plane of the lens assembly is designated by reference number 14.

As can be seen, lens assembly 10 is made up of two movable groups, the front lens group being identified with the reference numeral 20, and the rear lens group being identified by the reference numeral 22. Lens group 20 is made up of a negative meniscus shaped element A convex to the front, which is spaced in front of a negative meniscus element B convex to the front, which is spaced in front of a negative meniscus shaped element C convex to the front which is spaced in front of a positive meniscus shaped element D also convex to the front. The second movable lens group 22 comprises a double convex lens element E spaced from a double concave member F, (elements E and F having a stop element 24 interposed therebetween), and spaced in front of a doublet element comprising a double concave element G, the rear surface of which is cemented to a double convex element H.

The following chart is an example of constructional data for the preferred embodiment of the present invention.

CHART I

| GROUP | LENS | RADIUS | THICKNESS | SPACING | | $N_d$ At 4850A | V At 4050 to 5900A |
|---|---|---|---|---|---|---|---|
| 20 | A | $R_1$=7.9983<br>$R_2$=4.2693 | $t_1$=0.6154 | $S_0$= | 22.291 at 1.0X<br>24.786 at .806<br>26.455 at 0.605 | 1.6144 | 42.4167 |
| | B | $R_3$=3.8906<br>$R_4$=3.2777 | $t_2$=0.2440 | $S_1$= | .0749 | 1.7454 | 20.3842 |
| | C | $R_5$=2.1988<br>$R_6$=2.1140 | $t_3$=0.2137 | $S_2$= | 0.3338 | 1.5087 | 51.1000 |
| | D | $R_7$=3.4164<br>$R_8$=4.47581 | $t_4$=0.5981 | $S_3$= | 0.4985 | 1.7131 | 25.0906 |
| | | | | $S_4$= | .3247 at 1.0X<br>.5997 at 0.806<br>1.4566 at 0.65 | | |
| | E | $R_9$=4.8310<br>$R_{10}$=12.784 | $t_5$=1.2382 | | | 1.6091 | 49.4426 |
| | | $R_{11}$=−3.7473 | | $S_5$=<br>$S_6$= | 0.2053<br>0.2601 | 1.6368 | 28.2161 |

CHART I — Continued

| GROUP | LENS | RADIUS | THICKNESS | SPACING | $N_d$ At 4850A | V At 4050 to 5900A |
|---|---|---|---|---|---|---|
| 22 | F | $R_{12}=5.3255$ | $t_6=0.0608$ | | | |
| | | | | $S_7=$ 0.3949 | | |
| | G | $R_{13}=-82.536$ | $t_7=0.1275$ | | 1.5392 | 43.5164 |
| | | $R_{14}=3.8287$ | | | | |
| | | $R_{15}=3.8287$ | | | | |
| | H | | $t_8=0.8153$ | $S_8=$ {26.166 at 1.0X; 23.397 at .806; 20.871 at 0.65} | 1.6209 | 42.2001 |
| | | $R_{16}=-3.411$ | | | | |

NOTE:
F.O.V. = 36° - F/Number = 12.46 - Zoom Magnification Range = 1.00 × to 0.65 × - E.F.L. = From 13.3559 to 12.7128 - Stop Position = 0.2600 in front of element F. All dimensions in inches.

In the chart the radii of curvature R, the thickness $t$, the spacings S, the indices of refraction $N_d$ and the Abbe numbers V are all expressed in their customary manner.

The aforementioned adjustable lens assembly design is particularly adaptable for use in a copying apparatus wherein the image projected from the object being copied remains in focus throughout the zoom range and wherein the $f$/number also remains constant throughout the zoom range.

In the preferred embodiment, the magnification ranges from approximately −1.008 to about −0.65, the system operates in and is achromatic over the wavelength range from 4050A to 5900A, the $f$/number is 12.46 over the operating wavelength range and the field of view (wide angle) is 44°.

While the invention has been described with reference to its preferred embodiment, it will be understood by those skilled in the art that various changes may be made and equivalents substituted for elements thereof without departing from the true spirit and scope of the invention. In addition, many modifications may be made to adapt a particular situation or material to the teachings of the invention without departing from its essential teachings.

What is claimed is:

1. A zoom lens assembly substantially achromatic over the spectrum from about 4050A to about 5900A comprising an axially movable front lens group and an axially movable rear lens group, each lens group comprising four elements, the front movable lens group comprising, from the front to the rear, a first negative meniscus element convex to the front, a second negative meniscus element convex to the front, a third negative meniscus element convex to the front and a positive meniscus element convex to the front, the rear movable lens group comprising, from the front to the rear, a double convex element, a double concave element, and a doublet, said doublet comprising a double concave element the rear surface of which is cemented to a double convex element.

2. A zoom lens assembly made substantially according to the following chart of constructional data.

| GROUP | LENS | RADIUS | THICKNESS | SPACING | $N_d$ At 4850A | V At 4050 to 5900A |
|---|---|---|---|---|---|---|
| 20 | A | $R_1=7.9983$; $R_2=4.2693$ | $t_1=0.6154$ | $S_0=$ {22.291 at 1.0X; 24.786 at .806; 26.455 at 0.605} | 1.6144 | 42.4167 |
| | B | $R_3=3.8906$ | $t_2=0.2440$ | $S_1=$ 0749 | 1.7454 | 20.3842 |
| | | $R_4=3.2777$ | | | | |
| | C | $R_5=2.1988$; $R_6=2.1140$ | $t_3=0.2137$ | $S_2=$ 0.3338 | 1.5087 | 51.1000 |
| | | | | $S_3=$ 0.4985 | | |
| | D | $R_7=3.4164$ | $t_4=0.5981$ | $S_4=$ {.3247 at 1.0X; .5997 at 0.806; 1.4566 at 0.65} | 1.7131 | 25.0906 |
| | | $R_8=4.47581$ | | | | |
| 22 | E | $R_9=4.8310$ | $t_5=1.2382$ | | 1.6091 | 49.4426 |
| | | $R_{10}=12.754$ | | $S_5=$ 0.2053 | | |
| | | | | $S_6=$ 0.2601 | | |
| | F | $R_{11}=-3.7473$ | $t_6=0.0608$ | | 1.6368 | 28.2161 |
| | | $R_{12}=5.3255$ | | | | |
| | | | | $S_7=$ 0.3949 | | |
| | G | $R_{13}=-82.536$ | $t_7=0.1275$ | | 1.5392 | 43.5164 |
| | | $R_{14}=3.8287$ | | | | |
| | | $R_{15}=3.8287$ | | | | |
| | H | | $t_8=0.8153$ | $S_8=$ {26.166 at 1.0X; 23.397 at .806; 20.871 at 0.65} | 1.6209 | 42.2001 |
| | | $R_{16}=-3.411$ | | | | |

NOTE:
F.O.V. = 36° - F/Number = 12.46 - Zoom Magnification Range = 1.00 × to 0.65 × - E.F.L. = From 13.3559 to 12.7128 - Stop Position = 0.2600 in front of element F. All dimensions in inches.

* * * * *